United States Patent
Boykin et al.

(10) Patent No.: US 12,189,735 B2
(45) Date of Patent: Jan. 7, 2025

(54) SYSTEMS AND METHODS FOR SECURE ADAPTIVE ILLUSTRATIONS

(71) Applicant: Capital One Services, LLC, McLean, VA (US)

(72) Inventors: Laura Lee Boykin, McLean, VA (US); Zainab Zaki, Reston, VA (US); Joanna Weber, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 403 days.

(21) Appl. No.: 17/360,658

(22) Filed: Jun. 28, 2021

(65) Prior Publication Data

US 2022/0414193 A1   Dec. 29, 2022

(51) Int. Cl.
| | |
|---|---|
| *G06F 21/00* | (2013.01) |
| *G06F 18/22* | (2023.01) |
| *G06F 21/32* | (2013.01) |
| *G06V 10/56* | (2022.01) |
| *G06V 40/10* | (2022.01) |
| *G06V 40/16* | (2022.01) |
| *G06V 40/40* | (2022.01) |
| *G06V 40/60* | (2022.01) |
| *H04N 23/60* | (2023.01) |

(52) U.S. Cl.
CPC .............. *G06F 21/32* (2013.01); *G06F 18/22* (2023.01); *G06V 10/56* (2022.01); *G06V 40/10* (2022.01); *G06V 40/166* (2022.01); *G06V 40/172* (2022.01); *G06V 40/45* (2022.01); *G06V 40/67* (2022.01); *H04N 23/64* (2023.01); *G06F 2221/2103* (2013.01); *G06F 2221/2133* (2013.01)

(58) Field of Classification Search
CPC .. G06F 21/32; G06F 18/22; G06F 2221/2103; G06F 2221/2133; G06V 10/56; G06V 40/10; G06V 40/166; G06V 40/172; G06V 40/45; G06V 40/67; G06V 40/70; G06V 40/161; H04N 23/64; H04N 23/611; H04N 23/632; H04N 23/633
See application file for complete search history.

(56) References Cited

U.S. PATENT DOCUMENTS

| | | |
|---|---|---|
| 9,720,934 B1 | 8/2017 | Dube et al. |
| 9,805,213 B1 | 10/2017 | Kragh |

(Continued)

*Primary Examiner* — William A Corum, Jr.
(74) *Attorney, Agent, or Firm* — HUNTON ANDREWS KURTH LLP

(57) ABSTRACT

Systems and methods for adaptive verification may include a memory and a processor. The memory may be configured to store a plurality of animation templates. The processor may be configured to perform a first challenge process to request a first user image from a first predetermined distance, receive the first user image, request a second user image from a second predetermined distance, receive the second user image, transmit the first user image and the second user image for a verification process, the verification process including identification of one or more user attributes, receive a third user image associated with the one or more user attributes identified during the verification, and display the third user image including an adaptation, wherein the adaptation is generated for at least one of the plurality of animation templates, the adaptation illustrating the one or more user attributes.

20 Claims, 7 Drawing Sheets

(56) References Cited

U.S. PATENT DOCUMENTS

| | | |
|---|---|---|
| 10,417,399 B2 | 9/2019 | Wajs et al. |
| 10,509,932 B2 | 12/2019 | Ebrahimi et al. |
| 10,554,758 B2 | 2/2020 | Barry et al. |
| 10,904,245 B1 | 1/2021 | Slaby et al. |
| 11,703,949 B2 * | 7/2023 | Soni ............ G06V 10/764 |
| | | 382/156 |
| 2014/0028823 A1 * | 1/2014 | Tahk ............ H04N 23/661 |
| | | 348/77 |
| 2015/0356563 A1 | 12/2015 | Vohra et al. |
| 2017/0018007 A1 | 1/2017 | DeFrank et al. |
| 2017/0221244 A1 * | 8/2017 | Hiraga ............ H04N 23/635 |
| 2017/0270348 A1 * | 9/2017 | Morgana ............ H04N 23/611 |
| 2019/0087645 A1 * | 3/2019 | Agarwal ............ G06V 40/172 |
| 2019/0130538 A1 * | 5/2019 | Zeng ............ H04N 23/80 |
| 2019/0149537 A1 | 5/2019 | Ebrahimi et al. |
| 2019/0220583 A1 | 7/2019 | Douglas et al. |
| 2019/0253614 A1 * | 8/2019 | Oleson ............ H04N 23/62 |
| 2019/0303654 A1 * | 10/2019 | Vadassery ............ G06V 40/172 |
| 2020/0143186 A1 * | 5/2020 | Kato ............ G06V 20/64 |
| 2020/0145219 A1 | 5/2020 | Sebastian et al. |
| 2021/0011986 A1 * | 1/2021 | Tussy ............ G07C 9/00 |
| 2022/0249027 A1 * | 8/2022 | Chung ............ A61B 5/024 |

* cited by examiner

SYSTEMS AND METHODS FOR SECURE ADAPTIVE ILLUSTRATIONS

FIELD OF THE DISCLOSURE

The present disclosure relates to systems and methods for secure adaptive illustrations, including secure adaptive illustrations in front end web and mobile flows.

BACKGROUND

Electronic devices are widely prevalent in all aspects of society and frequently used in commercial, recreational, and social settings. A typical user will engage with multiple electronic devices every day to perform a variety of tasks. Since users have different degrees of familiarity with electronic devices, and electronic devices and the processes used to perform tasks on electronic devices can vary widely, the presentation of graphical interfaces for guidance and instructions is increasingly important.

Display screens of electronic devices can be used to coach users with guidance and instructions in performing operations, including identity verification and other tasks. However, techniques for providing guidance and instruction are not customized for a particular user.

It is further necessary to verify the user prior to granting access to an account or performing sensitive tasks, in order to avoid security risks and account misuse. Malicious attackers may be aware of and seek to exploit a user attempting to prove identity in order to gain access to an account. These malicious attackers may also disrupt the ability of a user to engage in activity with the account.

These and other deficiencies exist. Accordingly, there is a need for the generation of secure, adaptive illustrations for use with electronic devices.

SUMMARY OF THE DISCLOSURE

Embodiments of the present disclosure provide an adaptive verification system. The adaptive verification system may include a memory and a processor. The memory may be configured to store a plurality of animation templates. The processor may be configured to perform a first challenge process to request a first user image from a first predetermined distance, receive the first user image, request a second user image from a second predetermined distance, receive the second user image, transmit the first user image and the second user image for a verification process, the verification process including identification of one or more user attributes, receive a third user image associated with the one or more user attributes identified during the verification, and display the third user image including an adaptation, wherein the adaptation is generated for at least one of the plurality of animation templates, the adaptation illustrating the one or more user attributes.

Embodiments of the present disclosure provide a method for adaptive verification. The method may include requesting, by a processor, a first user image from a first predetermined distance. The method may include receiving, by the processor, the first user image. The method may include requesting, by the processor, a second user image from a second predetermined distance. The method may include receiving, by the processor, the second user image. The method may include transmitting, by the processor, the first user image and the second user image for a verification process, the verification process including identification of one or more user attributes. The method may include receiving, by the processor, a third user image associated with the one or more user attributes identified during the verification. The method may include displaying, by the processor, the third user image, the third user image comprising an adaptation that is generated for at least one of a plurality of animation templates, the adaptation illustrating the one or more user attributes.

Embodiments of the present disclosure provide a computer readable non-transitory medium comprising computer-executable instructions that are executed on a processor and comprising the steps of: requesting a first user image from a first predetermined distance; receiving the first user image; requesting a second user image from a second predetermined distance; receiving the second user image; transmitting the first user image and the second user image for a verification process, the verification process including identification of one or more user attributes; receiving a third user image associated with the one or more user attributes identified during the verification; and displaying, by the processor, the third user image, the third user image comprising an adaptation that is generated for at least one of a plurality of animation templates, the adaptation illustrating the one or more user attributes.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
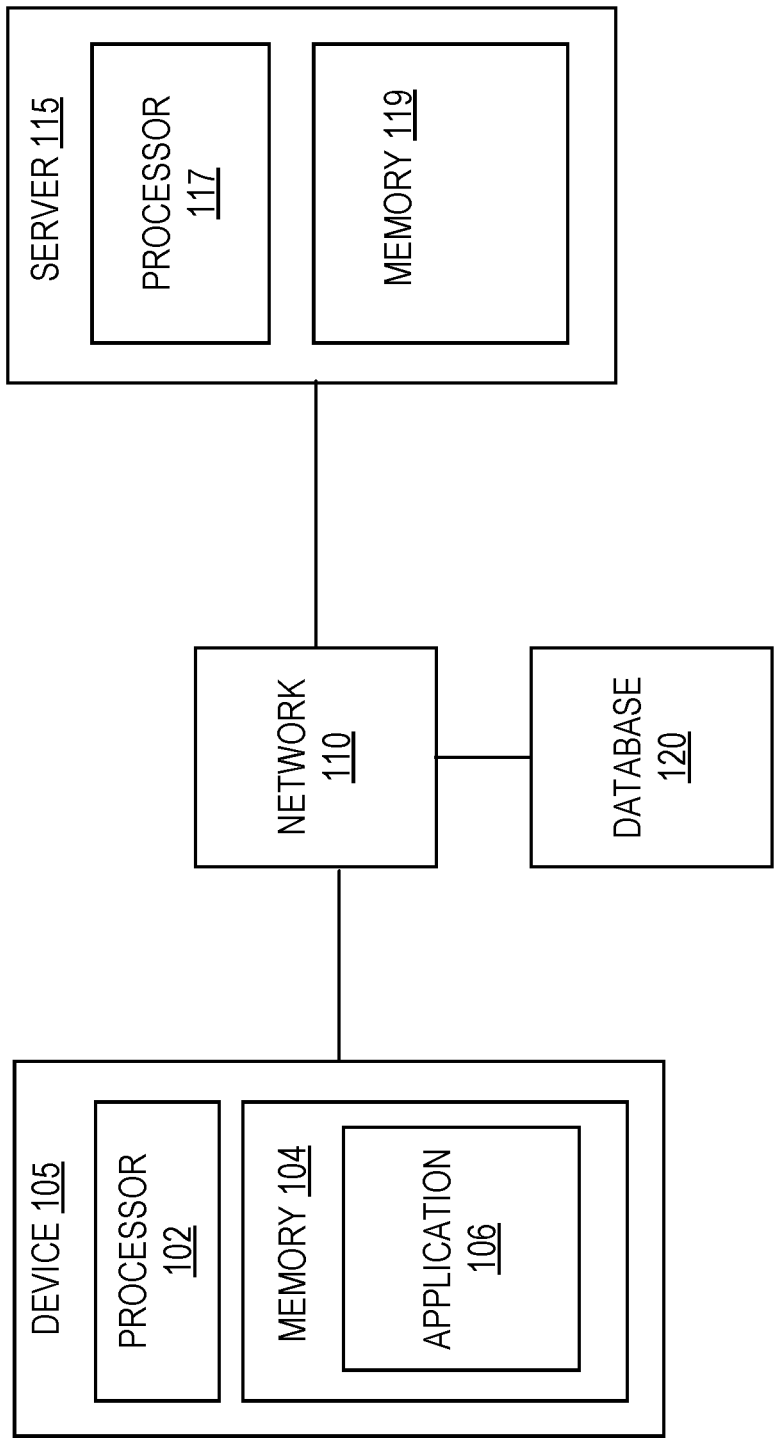
FIG. 1 illustrates an adaptive verification system according to an exemplary embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Upon determination of a particular type of transaction for a particular type of user, the systems and methods disclosed herein are able to perform verification and deliver customized information in real-time that is adapted to the particular type of user. By requesting a user to take different photos of themselves to verify that they are in fact the authorized individual to access the user account and providing additional authentication information, a graphical interface may be customized and trained to extract and display an animated illustration of one or more demographics of the user. The adaptive illustrations can therefore be based on user demographics. Accordingly, the presented guidance and instructions for performing tasks, and the verification process, are authentic to the user and do not appear as a generic ask. As such, the guidance, instructions, and verification is tailored to align with persona of the user for which the verification is being performed.

The use of the user's photos and additional authentication information in the systems and methods for secure adaptive illustrations described herein promotes security, as it is an additional ground of verification of the user. Security risks, such as unauthorized account access, data leaks, and fraud, are accordingly reduced. Malicious attackers will find it more difficult to gain unauthorized access to a user's account or a user's sensitive information.

The systems and methods for secure adaptive illustrations improve the interactive user experience, such as conducting or performing secure transactions from a mobile device to an automated teller machine, and builds and maintains trust with the user. By doing so, the guidance and instructions for performing tasks will be more effective and more efficient, and users will be more likely to engage with and operate the interface.

Further, the systems and methods for secure adaptive illustrations promotes system efficiency by reducing processing load. This allows for the conservation system resources and the potential redeployment of the conserved system resources towards other tasks.

The benefits of this systems and methods for secure adaptive illustrations discussed herein may be realized on a variety of electronic devices. As a non-limiting example, secure adaptive illustrations may be implemented in front end web and mobile flows displayed on mobile and wearable devices.

FIG. 1 illustrates an adaptive verification system 100. The system 100 may comprise may include a device 105, a network 110, a server 115, and a database 120. Although FIG. 1 illustrates single instances of components of system 100, system 100 may include any number of components.

System 100 may include a device 105. The device 105 may include one or more processors 122, and memory 104. Memory 104 may include one or more applications, such as application 106. The device 105 may be in data communication with any number of components of system 100. For example, the device 105 may transmit data via network 110 to server 115. The device 105 may transmit data via network 110 to database 120. Without limitation, the device 105 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device. The device 105 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The device 105 may include processing circuitry and may contain additional components, including processors (e.g., microprocessors), memories, error and parity/CRC checkers, data encoders, anticollision algorithms, controllers, command decoders, security primitives and tamperproofing hardware, as necessary to perform the functions described herein. The device 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 110. In some examples, network 110 may be one or more of a wireless network, a wired network or any combination of wireless network and wired network, and may be configured to connect to any one of components of system 100. For example, the device 105 may be configured to connect to server 115 via network 110. In some examples, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

System 100 may include one or more servers 115. In some examples, server 115 may include one or more processors 117 coupled to memory 119. Server 115 may be configured as a central system, server or platform to control and call various data at different times to execute a plurality of workflow actions. Server 115 may be configured to connect to device 105. Server 115 may be in data communication with the application 106. For example, a server 115 may be in data communication with application 106 via one or more networks 110. The device 105 may be in communication with one or more servers 115 via one or more networks 110, and may operate as a respective front-end to back-end pair with server 115. The device 105 may transmit, for example from application 106 executing thereon, one or more requests to server 115. The one or more requests may be associated with retrieving data from server 115. Server 115 may receive the one or more requests from device 105. Based on the one or more requests from processor 102 in data communication with application 106, server 115 may be configured to retrieve the requested data. Server 115 may be configured to transmit the received data to the processor 102 in data communication with application 106, the received data being responsive to one or more requests.

In some examples, server 115 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 115, it is understood that other embodiments can use multiple servers or multiple computer systems as necessary or desired to support the users and can also use back-up or redundant servers to prevent network downtime in the event of a failure of a particular server.

Server 115 may include an application in memory 119 comprising instructions for execution thereon. For example, the application may comprise instructions for execution on the server 115. The application may be in communication with any components of system 100. For example, server 115 may execute one or more applications that enable, for example, network and/or data communications with one or more components of system 100 and transmit and/or receive data. Without limitation, server 115 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 115 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 115 may include processing circuitry and may contain additional components, including processors (e.g., microprocessors), memories, error and parity/CRC checkers, data encoders, anticollision algorithms, controllers, command decoders, security primitives and tamperproofing hardware, as necessary to perform the functions described herein. The server 115 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 120. The database 120 may comprise a relational database, a non-relational database, or other database implementations, and any combination thereof, including a plurality of relational databases and non-relational databases. In some examples, the database 120 may comprise a desktop database, a mobile database, or an in-memory database. Further, the database 120 may be hosted internally by any component of system 100, such as the device 105 or server 115, or the database 120 may be hosted externally to any component of the system 100, such as the device 105 or server 115, by a cloud-based platform, or in any storage device that is in data communication with the device 105 and server 115. In some examples, database 120 may be in data communication with any number of components of system 100. For example, server 115 may be configured to retrieve the requested data from the database 120 that is transmitted by processor 102 in data communication with application 106. Server 115 may be configured to transmit the received data from database 120 the processor 102 in data communication with application 106 via network 110, the received data being responsive to the transmitted one or more requests. In other examples, the processor 102 in data communication with the application 106 may be configured to transmit one or more requests for the requested data from database 120 via network 110.

In some examples, exemplary procedures in accordance with the present disclosure described herein can be performed by a processing arrangement and/or a computing arrangement (e.g., a computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the device 105, server 115, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The memory 104 may be configured to store a plurality of animation templates. The processor 102 may be configured to perform one or more challenge processes. In some examples, the processor 102 may be configured to perform a first challenge process. For example, the processor 102 may be configured to perform a first challenge process to request a first user image from a first predetermined distance. The processor 102 may be configured to receive the first user image. The processor 102 may be configured to request a second user image from a second predetermined distance. The processor 102 may be configured to receive the second user image. The first user image and the second user image may each comprise selfie images of the user. In this manner, the first user image may include a close selfie, in which this information is compared to reference user information to determine a successful or unsuccessful match. The second user image may include a far selfie as indicative of liveness, in which this information is also compared to reference user information to determine a successful or unsuccessful match, while also proving or demonstrating that the captured second user image does not merely amount to capturing a photo of a photo, and rather, that there is existence of an actual human being. In some examples, the processor 102 may be configured to receive the first user image before receiving the second user image. It is understood that the processor 102 is not limited to such operations with respect to the request and processing of multiple image requests. For example, the processor 102 may be configured to request, via a single selfie capture, an image in which both the face of the user and the liveness or background may be detected. In this manner, the request of first and second user images would be eliminated and substituted by a single request by the processor 102, thereby reducing computational processing.

The processor 102 may be configured to transmit the first user image and the second user image for a verification process. In other examples, the processor 102 may be configured to transmit the image for a verification process, the image including the face of the user and liveness or background, as explained above. In some examples, the processor 102 may be configured to perform the verification process. In other examples, the server 115, such as processor 117, may be configured to perform the verification process based on one or more requests from the processor 102. Thus, any number and combination of the operations performed by the processor 102 may be partially or fully performed by the processor 117. For example, the verification process may include identification of one or more user attributes. Without limitation, the one or more user attributes may include at least one selected from the group of a skin or complexion tone, an eye color, a body build, and a hair color. The verification process may further include comparison of the first user image and the second user image with reference data that includes user information. The processor 102 may be configured to receive a third user image associated with the one or more user attributes identified during the verification. The processor 102 may be configured to display the third user image including an adaptation. In some examples, the adaptation may be generated for at least one of the plurality of animation templates. The adaptation may be configured to illustrate the one or more user attributes. The adaptation may be configured to depict a manner in which a user captures the first user image and the second user image, as further explained below with respect to the one or more generated instructions. In this manner, the processor 102 or processor 117 may be configured to look up the one or more user attributes, identify and extract in real-time the animated image design tagged to a desired demographic, and retrieve the animated image design for display. Without limitation, the adaptation may include a graphics interchange format (GIF) object.

In some examples, the processor 102 may be further configured to subject receipt of each of the first user image and the second user image within a predetermined time. For example, the processor 102 may be configured to request receipt of only the first user image within a predetermined time period. In another example, the processor 102 may be configured to request receipt of only the second user image within a same or different predetermined time period. In another example, the processor 102 may be configured to receipt of both the first and second user images within a same or different predetermined time period.

In some examples, the processor 102 may be further configured to delay any number of challenge processes if either of the first user image or the second user image are not received within the predetermined time. In some examples, the processor 102 may be further configured to delay only a first challenge process if either of the first user image or the second user image are not received within the predetermined time. In some examples, the processor 102 may be further configured to delay only a second challenge process if either of the first user image or the second user image are not received within the predetermined time. For example, the processor 102 may be configured to delay execution of the first challenge process for a first predetermined time period if the first user image is not received within a second predetermined time period. In another example, the processor 102 may be configured to delay execution of the first challenge process for a first predetermined time period if the second user image is not received within a second predetermined time period. In another example, the processor 102 may be configured to delay execution of the first challenge process for a first predetermined time period if the first user image and the second user image are not received within a second predetermined time period.

In some examples, the first predetermined time period and the second predetermined time period may include any number of seconds, minutes, or the like. For example, the first predetermined time period may be of a shorter duration than the second predetermined time period. In other examples, the second predetermined time period may be of a shorter duration than the first predetermined time period. In other examples, the first predetermined time period may be of the same duration as the second predetermined time period.

The processor 102 may be further configured to display one or more instructions on a graphic user interface of device 105 when requesting the first user image and the second user image. For example, a first instruction may instruct a user to capture the first user image. The first instruction may include an option to capture a portion of the face within a designated boundary, such as centered within a frame, at a different distance than compared to that of the second instruction. After the first user image has been captured, a preview of the captured first image may be displayed. The user may be presented with an option to cancel the captured first image and re-capture the first image. For example, a second instruction may instruct a user to capture the second user image. The second instruction may include an option to capture a portion of the face within a designated boundary, such as centered within a frame, at a different distance than compared to that of the first instruction. In addition, the second user image that is captured may comprise neck and/or clothing details, which is not the case for the first user image that is captured since the first user image represents a closer look of facial features. After the second user image has been captured, a preview of the captured second image may be displayed. The user may be presented with an option to cancel the captured second image and re-capture the second image.

In some examples, the second predetermined distance for capture of the second user image may exceed the first predetermined distance for capture of the first user image. Thus, each of the instructions may be configured to indicate the respective different distances for capture each of the first and second images.

The processor 102 may be further configured to perform a second challenge process including verification of one or more user input credentials. Without limitation, the one or more user input credentials may include login information, account information, security information, biometric information and/or any combination thereof (e.g., entry of a user name, a password, an account number, a security code, a one-time passcode, an answer to a security question, a fingerprint, a facial scan, a retinal scan, a voice recognition). For example, the processor 102 may be configured to verify a password and a security code by comparing these input credentials with reference input credentials so as to deny or permit access privilege to the application. In this manner, the processor 102 may be configured to verify the one or more user input credentials.

The processor 102 may be further configured to perform the first challenge process for one or more predetermined transactions. In some examples, the processor 102 may be configured to determine one or more types of transactions prior to performing any number of challenge processes. For example, the processor 102 may be configured determine a first type of transaction based on identification of a high-risk transaction. For example, a high-risk transaction may be based on evaluation of user information, amount information, date information, location information, time information, merchant information, and/or previous transaction information. In another example, the processor 102 may be configured to determine a second type of transaction based on identification of a suspicious transaction. For example, a suspicious transaction may be based on evaluation of transaction history information, transaction frequency over a given time period, transaction location, transaction amount, login and session information, and/or user account information. In addition, the processor 102 may be configured to perform any number of challenge processes for one or more predetermined users. In one example, the processor 102 may be configured to perform the first and/or second challenge processes for a first-time user. In another example, the processor 102 may be configured to perform the first and/or second challenge processes for only designated users, such as only those who conduct a transaction at a particular merchant(s), at a particular day and/or time, and/or for a particular amount. In another example, the processor 102 may be configured to reduce computational processing load for device 105 by removing the need for generation and display for the one or more instructions regarding the first user image and second user image capture based on a determination of a repeat (such as a user who is adjudicated to frequently engage in an active application session) and/or long-time user (such as a user who is adjudicated to periodically engage in an active application session). In this manner, the processor 102 may be configured to improve security by performing risk assessment based on the type of transaction and the type of user.

Figure 2:
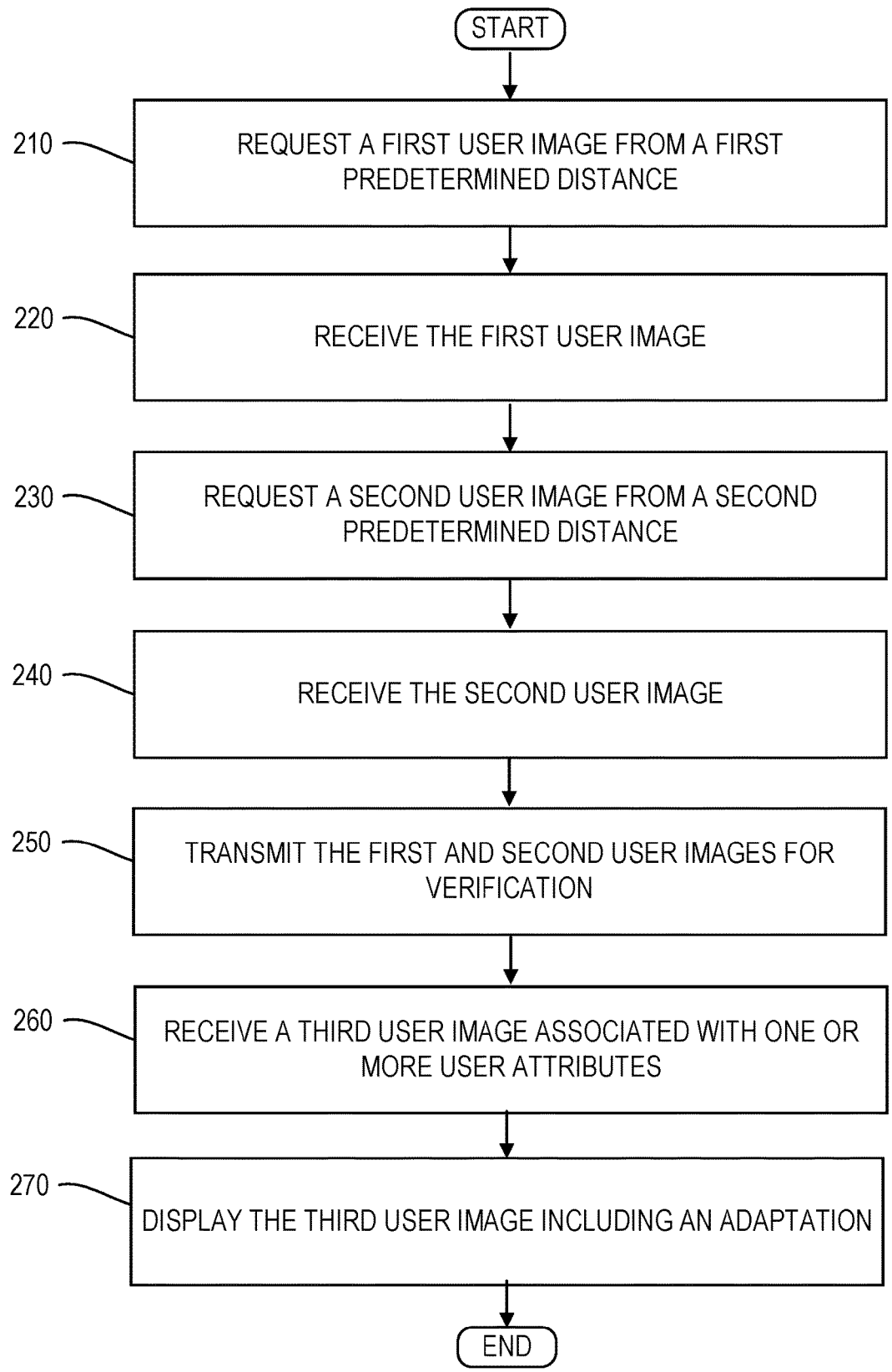
FIG. 2 illustrates a method of adaptive verification according to an exemplary embodiment.

FIG. 2 illustrates a method 200 of adaptive verification according to an exemplary embodiment. Method 200 may reference the same or similar components of system 100, as explained above with respect to FIG. 1.

At step 210, the method may include requesting, by a processor, a first user image from a first predetermined distance. For example, the processor may be configured to perform one or more challenge processes. In some examples, the processor may be configured to perform a first challenge process. For example, the processor may be configured to perform a first challenge process to request a first user image from a first predetermined distance.

At step 220, the method may include receiving, by the processor, the first user image. For example, the processor may be configured to receive the first user image.

At step 230, the method may include requesting, by the processor, a second user image from a second predetermined distance.

At step 240, the method may include receiving, by the processor, the second user image. For example, the first user image and the second user image may each comprise selfie images of the user. In this manner, the first user image may include a close selfie, in which this information is compared to reference user information to determine a successful or unsuccessful match. The second user image may include a far selfie as indicative of liveness, in which this information is also compared to reference user information to determine a successful or unsuccessful match, while also proving or demonstrating that the captured second user image does not merely amount to capturing a photo of a photo, and rather, that there is existence of an actual human being. In some examples, the processor may be configured to receive the first user image before receiving the second user image. It is understood that the processor is not limited to such operations with respect to the request and processing of multiple image requests. For example, the processor may be configured to request, via a single selfie capture, an image in which both the face of the user and the liveness or background may be detected. In this manner, the request of first and second user images would be eliminated and substituted by a single request by the processor, thereby reducing computational processing.

At step 250, the method may include transmitting, by the processor, the first user image and the second user image for a verification process, the verification process including identification of one or more user attributes. In other examples, the processor may be configured to transmit the image for a verification process, the image including the face of the user and liveness or background, as explained above. For example, the processor may be configured to transmit the first user image and the second user image for a verification process. For example, the verification process may include identification of one or more user attributes. Without limitation, the one or more user attributes may include at least one selected from the group of a skin or complexion tone, an eye color, a body build, and a hair color. The verification process may further include comparison of the first user image and the second user image with reference data that includes user information.

At step 260, the method may include receiving, by the processor, a third user image associated with the one or more user attributes identified during the verification.

At step 270, the method may include displaying, by the processor, the third user image, the third user image comprising an adaptation that is generated for at least one of a plurality of animation templates, the adaptation illustrating the one or more user attributes. The processor may be configured to display the third user image including an adaptation. In some examples, the adaptation may be generated for at least one of the plurality of animation templates. The adaptation may be configured to illustrate the one or more user attributes. The adaptation may be configured to depict a manner in which a user captures the first user image and the second user image, as further explained below with respect to the one or more generated instructions. In this manner, the processor may be configured to look up the one or more user attributes, identify and extract in real-time the animated image design tagged to a desired demographic, and retrieve the animated image design for display. Without limitation, the adaptation may include a graphics interchange format (GIF) object.

In some examples, the processor may be further configured to subject receipt of each of the first user image and the second user image within a predetermined time. For example, the processor may be configured to request receipt of only the first user image within a predetermined time period. In another example, the processor may be configured to request receipt of only the second user image within a same or different predetermined time period. In another example, the processor may be configured to receipt of both the first and second user images within a same or different predetermined time period.

In some examples, the processor may be further configured to delay any number of challenge processes if either of the first user image or the second user image are not received within the predetermined time. In some examples, the processor may be further configured to delay only a first challenge process if either of the first user image or the second user image are not received within the predetermined time. In some examples, the processor may be further configured to delay only a second challenge process if either of the first user image or the second user image are not received within the predetermined time. For example, the processor may be configured to delay execution of the first challenge process for a first predetermined time period if the first user image is not received within a second predetermined time period. In another example, the processor may be configured to delay execution of the first challenge process for a first predetermined time period if the second user image is not received within a second predetermined time period. In another example, the processor may be configured to delay execution of the first challenge process for a first predetermined time period if the first user image and the second user image are not received within a second predetermined time period.

In some examples, the first predetermined time period and the second predetermined time period may include any number of seconds, minutes, or the like. For example, the first predetermined time period may be of a shorter duration than the second predetermined time period. In other examples, the second predetermined time period may be of a shorter duration than the first predetermined time period. In other examples, the first predetermined time period may be of the same duration as the second predetermined time period.

The processor may be further configured to display one or more instructions when requesting the first user image and the second user image. For example, a first instruction may instruct a user to capture the first user image. The first instruction may include an option to capture a portion of the face within a designated boundary, such as centered within a frame, at a different distance than compared to that of the second instruction. After the first user image has been captured, a preview of the captured first image may be displayed. The user may be presented with an option to cancel the captured first image and re-capture the first image. For example, a second instruction may instruct a user to capture the second user image. The second instruction may include an option to capture a portion of the face within a designated boundary, such as centered within a frame, at a different distance than compared to that of the first instruction. In addition, the second user image that is captured may comprise neck and/or clothing details, which is not the case for the first user image that is captured since the first user image represents a closer look of facial features. After the second user image has been captured, a preview of the captured second image may be displayed. The user may be presented with an option to cancel the captured second image and re-capture the second image.

In some examples, the second predetermined distance for capture of the second user image may exceed the first predetermined distance for capture of the first user image. Thus, each of the instructions may be configured to indicate the respective different distances for capture each of the first and second images.

The processor may be further configured to perform a second challenge process including verification of one or more user input credentials. Without limitation, the one or more user input credentials may include login information, account information, security information, biometric information and/or any combination thereof (e.g., entry of a user name, a password, an account number, a security code, a one-time passcode, an answer to a security question, a fingerprint, a facial scan, a retinal scan, a voice recognition). For example, the processor may be configured to verify a password and a security code by comparing these input credentials with reference input credentials so as to deny or permit access privilege to the application. In this manner, the one or more processors may be configured to verify the one or more user input credentials.

The processor may be further configured to perform the first challenge process for one or more predetermined transactions. In some examples, the processor may be configured to determine one or more types of transactions prior to performing any number of challenge processes. For example, the processor may be configured determine a first type of transaction based on identification of a high-risk transaction. For example, a high-risk transaction may be based on evaluation of user information, amount information, date information, location information, time information, merchant information, and/or previous transaction information. In another example, the processor may be configured to determine a second type of transaction based on identification of a suspicious transaction. For example, a suspicious transaction may be based on evaluation of transaction history information, transaction frequency over a given time period, transaction location, transaction amount, login and session information, and/or user account information. In addition, the processor may be configured to perform any number of challenge processes for one or more predetermined users. In one example, the processor may be configured to perform the first and/or second challenge processes for a first-time user. In another example, the processor may be configured to perform the first and/or second challenge processes for only designated users, such as only those who conduct a transaction at a particular merchant(s), at a particular day and/or time, and/or for a particular amount. In another example, the processor may be configured to reduce computational processing load for a device by removing the need for generation and display for the one or more instructions regarding the first user image and second user image capture based on a determination of a repeat (such as a user who is adjudicated to frequently engage in an active application session) and/or long-time user (such as a user who is adjudicated to periodically engage in an active application session). In this manner, the processor may be configured to improve security by performing risk assessment based on the type of transaction and the type of user.

Figure 3A:
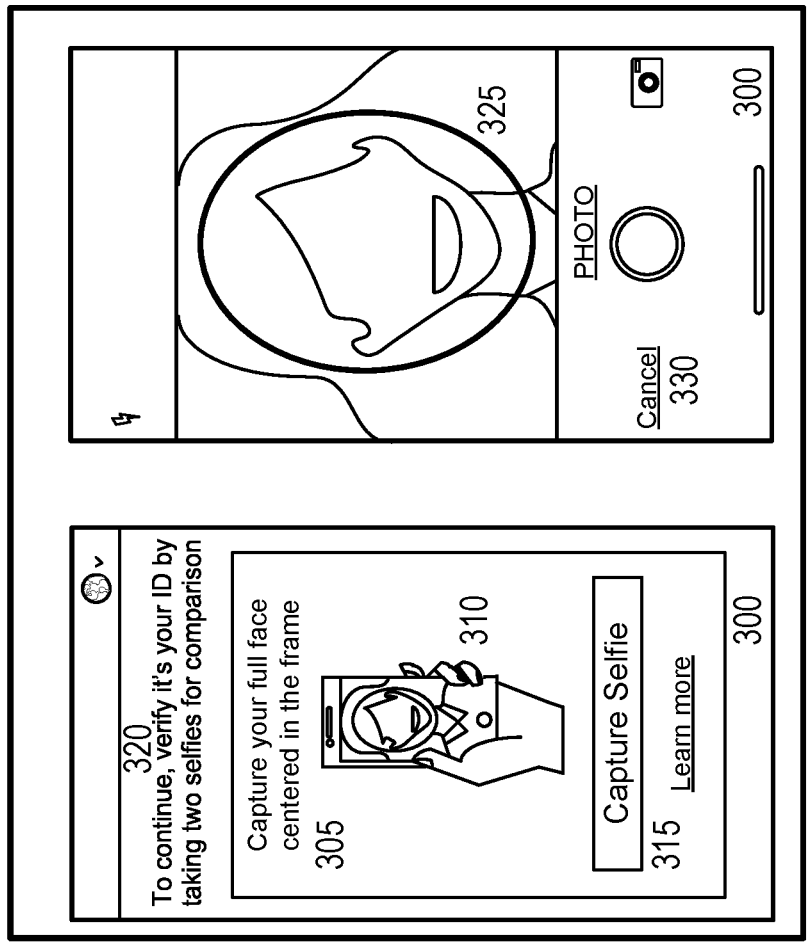
FIG. 3A and FIG. 3B illustrate a graphic user interface according to an exemplary embodiment.
Figure 3B:
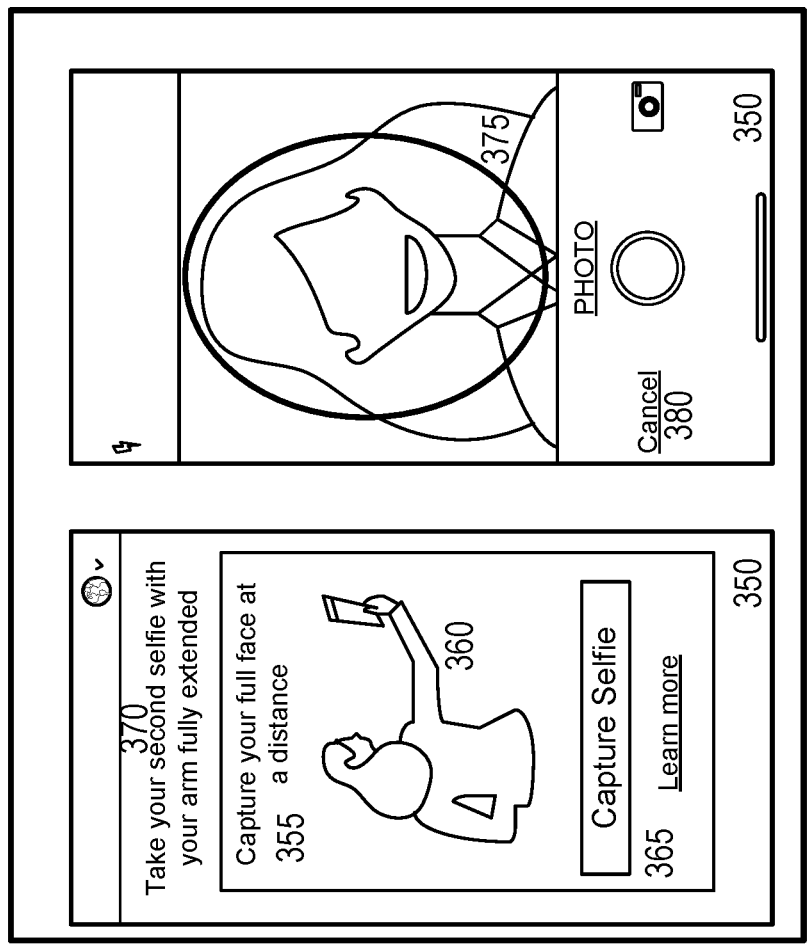

FIG. 3A illustrates a graphic user interface 300 according to an exemplary embodiment. FIG. 3B illustrates a graphic user interface 350 according to an exemplary embodiment.

FIGS. 3A and 3B may reference the same or similar components of system 100 of FIG. 1, and method 200 of FIG. 2.

As depicted in FIG. 3A, a first instruction 305 may be generated for display. For example, the first instruction 305 may be configured to request capture of a first user image. The first instruction 305 may also be configured to request a full face of the user disposed within a frame. In addition, the graphic user interface 300 may be configured to visually display 310 a manner to take the near selfie along with a device, including but not limited to a mobile device. Once the first user image is ready for capture, the capture button 315 may be selected to obtain the first user image. In this manner, capture guidance regarding the near selfie may be provided on the graphic user interface 300. At another portion of the graphic user interface 300, a message 320 may be generated for display to indicate a preview of actions needed for verification of the user.

As further illustrated in FIG. 3A, the captured first user image 325 may be displayed on graphic user interface 300. Should the user desire a different capture of the first user image 325, or should the captured first user image 325 not include the full face centered in the frame, a cancel button 330 may be selected to re-capture the first user image. In some examples, the captured first user image 325 may be surrounded by a bold oval (or any other shape) border to standout from the background, in which the background may be darkened or blurred to provide better resolution of the captured first user image.

FIG. 3B illustrates a graphic user interface 350 according to an exemplary embodiment. As depicted in FIG. 3B, a second instruction 355 may be generated for display. For example, the second instruction 355 may be configured to request capture of a second user image. The second instruction 355 may also be configured to request a full face of the user disposed within a frame. In addition, the graphic user interface 350 may be configured to visually display 360 a manner to take the far selfie along with a device, including but not limited to a mobile device. Once the second user image is ready for capture, the capture button 365 may be selected to obtain the second user image. In this manner, capture guidance regarding the far selfie may be provided on the graphic user interface 350. At another portion of the graphic user interface 300, a message 370 may be generated for display to indicate specificity regarding the second user image, including a disposition of a body member, such as a fully or partially extended arm.

As further illustrated in FIG. 3B, the captured second user image 375 may be displayed on graphic user interface 300. Should the user desire a different capture of the second user image 375, or should the captured second user image 375 not include the full face centered in the frame, a cancel button 380 may be selected to re-capture the second user image. In some examples, the captured second user image 375 may be surrounded by a bold oval (or any other shape) border to standout from the background, in which the background may be darkened or blurred to provide better resolution of the captured second user image.

Figure 4:
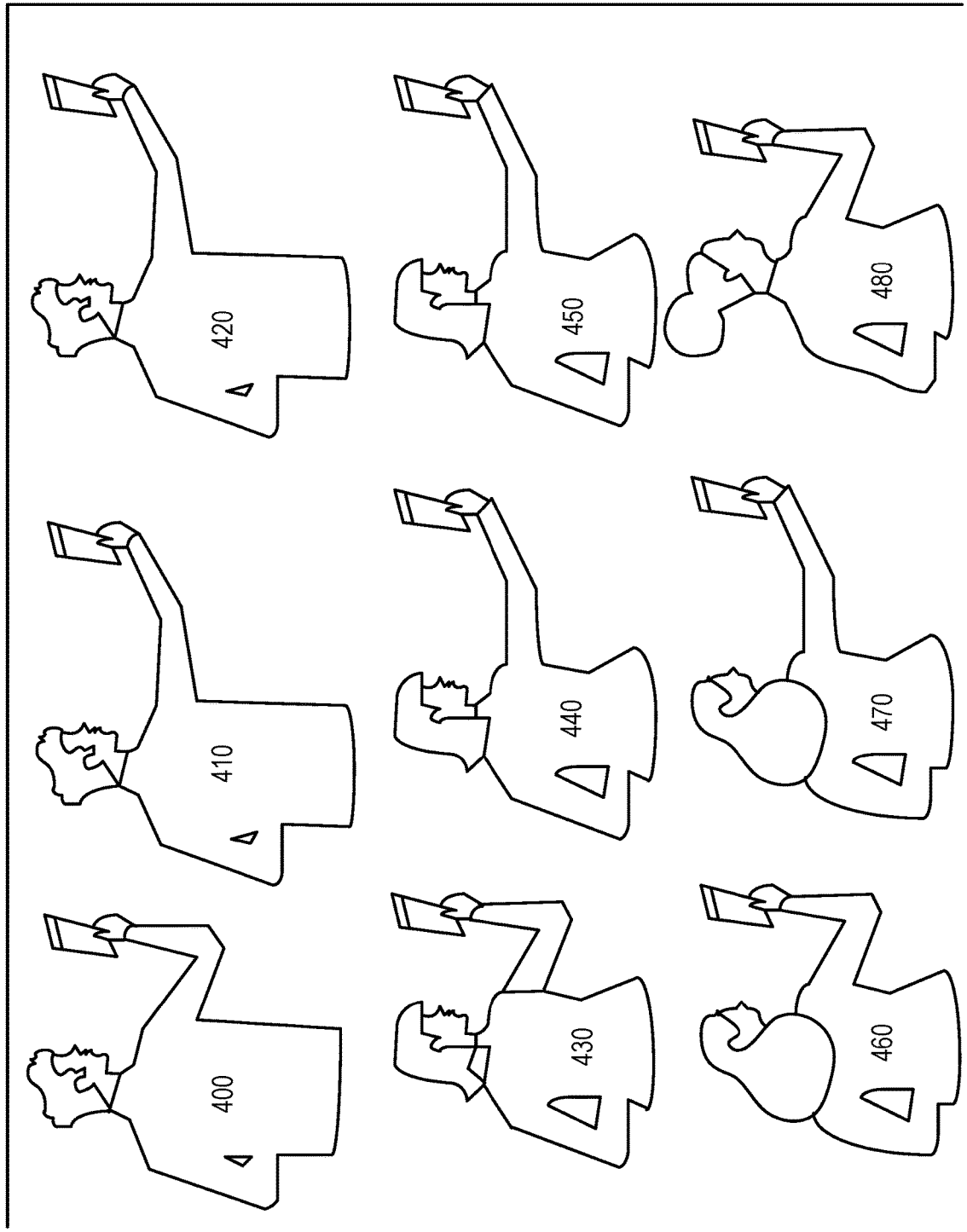
FIG. 4 illustrates an adaptive animated graphic according to an exemplary embodiment.

FIG. 4 depicts adaptive animated graphics according to an exemplary embodiment. FIG. 4 may reference the same or similar components of system 100, method 200 of FIG. 2, and graphic user interfaces of FIGS. 3A and 3B.

In some examples, the animated graphics may be generated and stored as a plurality of templates in a memory, and obtained for retrieval in real-time for adaptation for a user based on user information and subsequently displayed on a graphic user interface. These adaptive animated graphics may be each be configured to illustrate one or more user attributes. It is understood that additional user attributes may be included, and that the user is not limited to a male or a female. The adaptive animated graphic 400 may be configured to display a manner to capture the first user image for a first user, such as a near selfie for a male user. The adaptive animated graphic 410 may be configured to display a manner to capture the second user image for the first user, such as a far selfie for the male user. The adaptive animated graphic 420 may be configured to display a manner to capture the second user image for the different user, such as a far selfie for a different male user, the different male user having, without limitation, a different skin or complexion tone than that of the male user in adaptive animated graphic 400.

The adaptive animated graphic 430 may be configured to display a manner to capture the first user image for a first user, such as a near selfie for a female user. The adaptive animated graphic 440 may be configured to display a manner to capture the second user image for the first user, such as a far selfie for the female user. The adaptive animated graphic 450 may be configured to display a manner to capture the second user image for the different user, such as a far selfie for a different female user, the different female user having, without limitation, a different hair color than that of the female user in adaptive animated graphic 430.

The adaptive animated graphic 460 may be configured to display a manner to capture the first user image for a first user, such as a near selfie for a female user. The adaptive animated graphic 470 may be configured to display a manner to capture the second user image for the first user, such as a far selfie for the female user. The adaptive animated graphic 480 may be configured to display a manner to capture the second user image for the different user, such as a far selfie for a different female user, the different female user having, without limitation, a different hair style than that of the female user in adaptive animated graphic 460.

Figure 5:
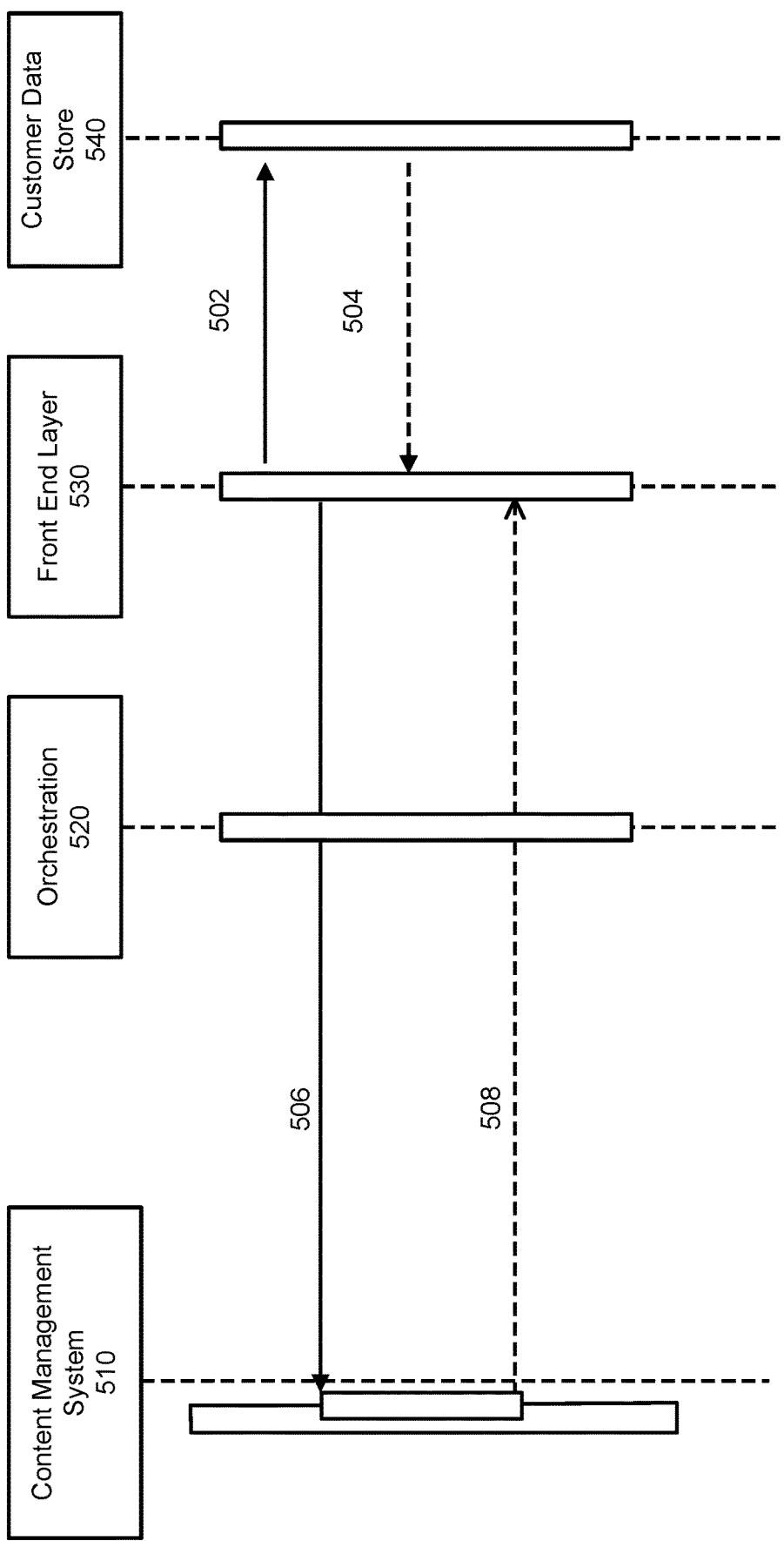
FIG. 5 illustrates a sequence diagram according to an exemplary embodiment.

FIG. 5 depicts illustrates a sequence diagram 500 according to an exemplary embodiment. FIG. 5 may reference the same or similar components of system 100, method 200 of FIG. 2, graphic user interfaces of FIGS. 3A and 3B, and adaptive animated graphics of FIG. 4.

The sequence diagram may include a content management system 510, an orchestration layer 520, a front end layer 530, and a customer data store 540. In some examples, the orchestration layer 520 may be configured to serve as a pass through component that manages the data transmission between the front end layer 530 and the backend. Without limitation, the orchestration layer 520 may be configured to render the appropriate user experiences to each user, such as context, images, copy, user attributes, and error screens, based on their specific input variables. At sequence step 502, the front end layer 530 may be configured to retrieve user information. For example, the front end layer 530 may be configured to transmit one or more requests to the customer data store regarding the user information. At sequence step 504, the front end layer 530 may be configured to receive one or more responses based on the one or more transmitted requests. For example, the customer data store 540 may be configured to transmit one or more responses to the front end layer 530, the one or more responses including the requested user information. At sequence step 506, the front end layer 530 may be configured to transmit one or more requests for user experience artifacts based on personally identifiable information extracted from the user information. In some examples, the user experience artifacts may be utilized to generate the adaptation illustrating one or more user attributes. For example, the front end layer 530 may be configured to transmit one or more requests to the content management system 510. Responsive to the one or more requests from the front end layer 530, the content management system 510 may be configured to transmit one or more responses to the front end layer 530 at sequence step 508. The one or more responses may return the user experience artifacts from a relevant library. The front end layer 530 may be configured to receive the one or more responses from the content management system 510. In this manner, the front end layer 530 may be configured to retrieve the generated user experience artifacts in real-time for adaptive display of the adaptation illustrating one or more user attributes for the particular user based on the user information.

Figure 6:
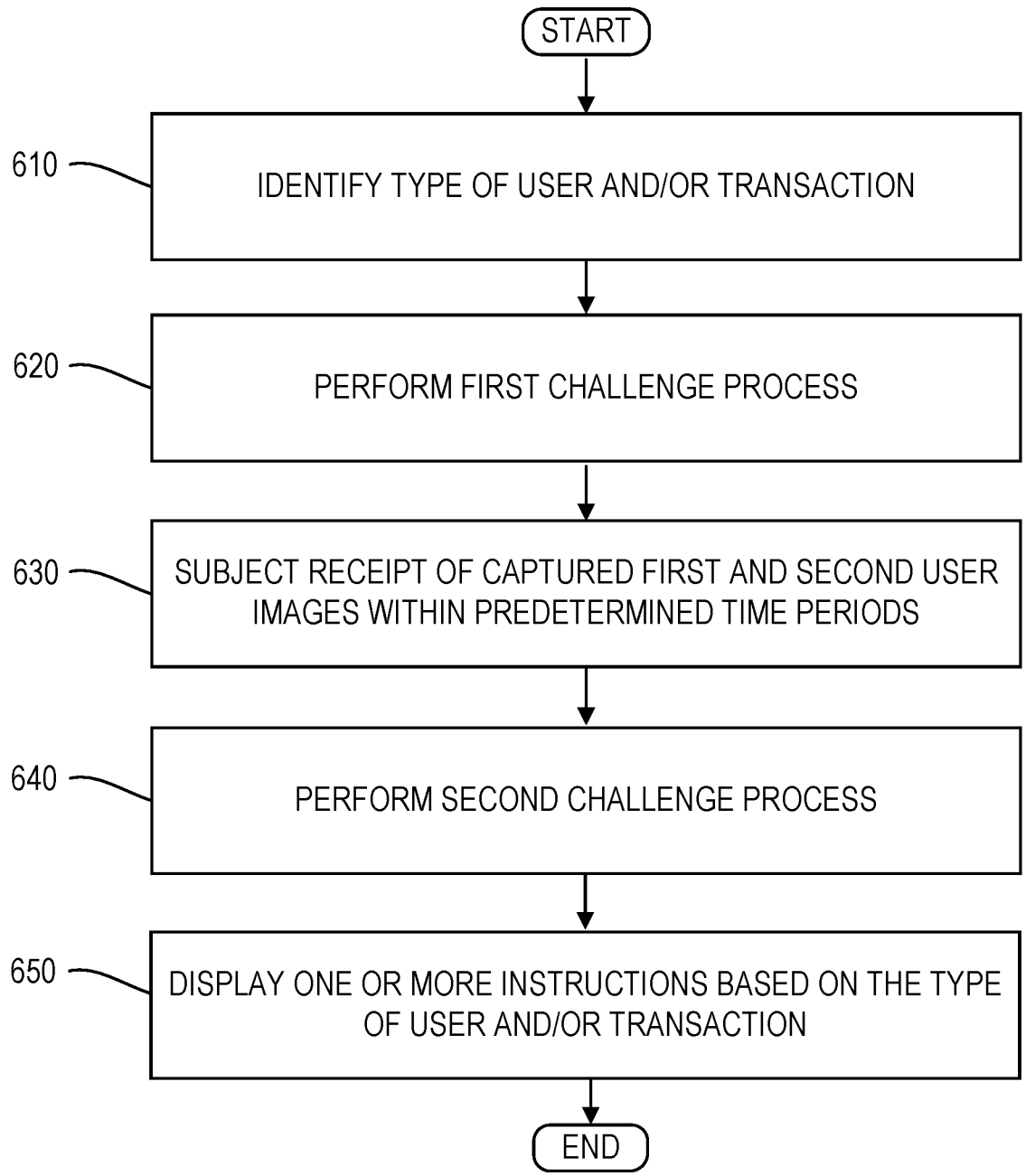
FIG. 6 illustrates a method of adaptive verification according to an exemplary embodiment.

FIG. 6 depicts a method 600 for adaptive verification according to an exemplary embodiment. FIG. 6 may reference the same or similar components of system 100, method 200, graphic user interfaces 300 of FIGS. 3A and 3B, adaptive animated graphics of FIG. 4, and sequence diagram 500 of FIG. 5.

At block 610, the method 600 may include identifying one or more types of users and/or transactions. For example, a processor may be configured to determine one or more types of transactions prior to performing any number of challenge processes. For example, the processor may be configured determine a first type of transaction based on identification of a high-risk transaction. For example, a high-risk transaction may be based on evaluation of user information, amount information, date information, location information, time information, merchant information, and/or previous transaction information. In another example, the processor may be configured to determine a second type of transaction based on identification of a suspicious transaction. For example, a suspicious transaction may be based on evaluation of transaction history information, transaction frequency over a given time period, transaction location, transaction amount, login and session information, and/or user account information.

In addition, the processor may be configured to perform any number of challenge processes for one or more predetermined users. In one example, the processor may be configured to perform a first and/or second challenge processes for a first-time user. In another example, the processor may be configured to perform the first and/or second challenge processes for only designated users, such as only those who conduct a transaction at a particular merchant(s), at a particular day and/or time, and/or for a particular amount. In another example, the processor may be configured to reduce computational processing load for a device by removing the need for generation and display for the one or more instructions regarding the first user image and second user image capture based on a determination of a repeat (such as a user who is adjudicated to frequently engage in an active application session) and/or long-time user (such as a user who is adjudicated to periodically engage in an active application session). In this manner, the processor may be configured to improve security by performing risk assessment based on the type of transaction and the type of user.

At block 620, the method 600 may include performing a first challenge process. For example, the processor may be configured to perform one or more challenge processes. In some examples, the processor may be configured to perform a first challenge process. For example, the processor may be configured to perform a first challenge process to request a first user image from a first predetermined distance. For example, the processor may be configured to receive the first user image. The method may include requesting, by the processor, a second user image from a second predetermined distance. The method may include receiving, by the processor, the second user image. For example, the first user image and the second user image may each comprise selfie images of the user. In this manner, the first user image may include a close selfie, in which this information is compared to reference user information to determine a successful or unsuccessful match. The second user image may include a far selfie as indicative of liveness, in which this information is also compared to reference user information to determine a successful or unsuccessful match, while also proving or demonstrating that the captured second user image does not merely amount to capturing a photo of a photo, and rather, that there is existence of an actual human being. In some examples, the processor may be configured to receive the first user image before receiving the second user image. It is understood that the processor is not limited to such operations with respect to the request and processing of multiple image requests. For example, the processor may be configured to request, via a single selfie capture, an image in which both the face of the user and the liveness or background may be detected. In this manner, the request of first and second user images would be eliminated and substituted by a single request by the processor, thereby reducing computational processing. As previously explained, the processor may be configured to transmit the image for a verification process, the image including the face of the user and liveness or background.

In some examples, the second predetermined distance for capture of the second user image may exceed the first predetermined distance for capture of the first user image. Thus, each of the instructions may be configured to indicate the respective different distances for capture each of the first and second images.

At block 630, the method 600 may include subjecting receipt of captured first and second user images within predetermined time periods. For example, the processor may be further configured to subject receipt of each of the first user image and the second user image within a predetermined time. For example, the processor may be configured to request receipt of only the first user image within a predetermined time period. In another example, the processor may be configured to request receipt of only the second user image within a same or different predetermined time period. In another example, the processor may be configured to receipt of both the first and second user images within a same or different predetermined time period.

In some examples, the first predetermined time period and the second predetermined time period may include any number of seconds, minutes, or the like. For example, the first predetermined time period may be of a shorter duration than the second predetermined time period. In other examples, the second predetermined time period may be of a shorter duration than the first predetermined time period. In other examples, the first predetermined time period may be of the same duration as the second predetermined time period.

At block 640, the method 600 may include performing a second challenge process. For example, the processor may be further configured to perform a second challenge process including verification of one or more user input credentials. Without limitation, the one or more user input credentials may include login information, account information, security information, biometric information and/or any combination thereof (e.g., entry of a user name, a password, an account number, a security code, a one-time passcode, an answer to a security question, a fingerprint, a facial scan, a retinal scan, a voice recognition). For example, the processor may be configured to verify a password and a security code by comparing these input credentials with reference input credentials so as to deny or permit access privilege to the application. In this manner, the one or more processors may be configured to verify the one or more user input credentials.

At block 650, the method 600 may include displaying one or more instructions based on the type of user and/or transaction. The processor may be further configured to display one or more instructions when requesting the first user image and the second user image. For example, a first instruction may instruct a user to capture the first user image. The first instruction may include an option to capture a portion of the face within a designated boundary, such as centered within a frame, at a different distance than compared to that of the second instruction. After the first user image has been captured, a preview of the captured first image may be displayed. The user may be presented with an option to cancel the captured first image and re-capture the first image. For example, a second instruction may instruct a user to capture the second user image. The second instruction may include an option to capture a portion of the face within a designated boundary, such as centered within a frame, at a different distance than compared to that of the first instruction. In addition, the second user image that is captured may comprise neck and/or clothing details, which is not the case for the first user image that is captured since the first user image represents a closer look of facial features. After the second user image has been captured, a preview of the captured second image may be displayed. The user may be presented with an option to cancel the captured second image and re-capture the second image.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. An adaptive verification system comprising:
a memory storing a plurality of animation templates; and
a processor, the processor configured to perform a first challenge process to:
request a first user image from a first predetermined distance,
receive the first user image,
request a second user image from a second predetermined distance, the second predetermined distance being further away from a user than the first user image and capturing at least a portion of a background behind the user,
receive the second user image,
transmit the first user image and the second user image for a verification process, the verification process including identification of one or more user attributes and a confirmation of liveness based on the captured portion of the background in the second user image,
receive a third user image associated with the one or more user attributes identified during the verification, and
display an animated graphics interchange format (GIF) object of a generic person from the plurality of animation templates wherein the animated GIF is adapted to include the one or more user attributes in the third user image, the one or more attributes comprising a user skin tone, a user hair color, a body build, and a user eye color.

2. The adaptive verification system of claim 1, wherein the processor is further configured to subject receipt of each of the first user image and the second user image within a predetermined time.

3. The adaptive verification system of claim 2, wherein the processor is further configured to delay the first challenge process if either of the first user image or the second user image are not received within the predetermined time.

4. The adaptive verification system of claim 1, wherein the verification process further comprises comparison of the first user image and the second user image with reference data that includes user information.

5. The adaptive verification system of claim 1, wherein the processor is further configured to display one or more instructions when requesting the first user image and the second user image.

6. The adaptive verification system of claim 1, wherein the second predetermined distance exceeds the first predetermined distance.

7. The adaptive verification system of claim 1, wherein the one or more user attributes includes at least one selected from the group of a skin or complexion tone, an eye color, a body build, and a hair color.

8. The adaptive verification system of claim 1, wherein the processor is further configured to perform a second challenge process including verification of one or more user input credentials.

9. The adaptive verification system of claim 1, wherein the processor is further configured to perform the first challenge process for one or more predetermined transactions.

10. The adaptive verification system of claim 1, wherein the adaptation depicts a manner in which a user captures the first user image and the second user image.

11. A method of adaptive verification, the method comprising the steps of:
- requesting, by a processor, a first user image from a first predetermined distance;
- receiving, by the processor, the first user image;
- requesting, by the processor, a second user image from a second predetermined distance, the second predetermined distance being further away from a user than the first user image and capturing at least a portion of a background behind the user;
- receiving, by the processor, the second user image;
- transmitting, by the processor, the first user image and the second user image for a verification process, the verification process including identification of one or more user attributes and a confirmation of liveness based on the captured portion of the background in the second user image;
- receiving, by the processor, a third user image associated with the one or more user attributes identified during the verification; and
- displaying, by the processor, an animated graphics interchange format (GIF) object of a generic person from a plurality of animation templates wherein the animated GIF is adapted to include the one or more user attributes in the third user image, the one or more attributes comprising a user skin tone, a user hair color, a body build, and a user eye color.

12. The method of claim 11, further comprising subjecting, by the processor, receipt of each of the first user image and the second user image within a predetermined time.

13. The method of claim 12, further comprising delaying, by the processor, the verification process if either of the first user image or the second user image are not received within the predetermined time.

14. The method of claim 11, wherein the verification process further comprises comparison of the first user image and the second user image with reference data that includes user information.

15. The method of claim 11, further comprising displaying, by the processor, one or more instructions when requesting the first user image and the second user image.

16. The method of claim 11, wherein the second predetermined distance exceeds the first predetermined distance.

17. The method of claim 11, wherein the adaptation depicts a manner in which the user captures the first user image and the second user image.

18. The method of claim 11, wherein the one or more user attributes includes at least one selected from the group of a skin or complexion tone, an eye color, a body build, and a hair color.

19. The method of claim 11, further comprising performing, by the processor, the verification process for one or more predetermined transactions.

20. A computer-readable non-transitory medium comprising computer-executable instructions that, when executed by at least one processor, perform procedures comprising the steps of:
- requesting a first user image from a first predetermined distance;
- receiving the first user image;
- requesting a second user image from a second predetermined distance, the second predetermined distance being further away from a user than the first user image and capturing at least a portion of a background behind the user;
- receiving the second user image;
- transmitting the first user image and the second user image for a verification process, the verification process including identification of one or more user attributes and a confirmation of liveness based on the captured portion of the background in the second user image;
- receiving a third user image associated with the one or more user attributes identified during the verification; and
- displaying, by the processor, an animated graphics interchange format (GIF) object of a generic person from the plurality of animation templates wherein the animated GIF is adapted to include the one or more user attributes in the third user image, the one or more attributes comprising a user skin tone, a user hair color, a body build, and a user eye color.

* * * * *